US010480589B2

(12) United States Patent
Carey et al.

(10) Patent No.: US 10,480,589 B2
(45) Date of Patent: Nov. 19, 2019

(54) FLUID DRAINING THROUGH CLUTCH PLATES HAVING SEPARATOR FEATURES

(71) Applicant: GM GLOBAL TECHNOLOGY OPERATIONS LLC, Detroit, MI (US)

(72) Inventors: Clinton E Carey, Highland, MI (US); Daryl A Wilton, Macomb, MI (US); James M Hart, Belleville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 213 days.

(21) Appl. No.: 15/634,600

(22) Filed: Jun. 27, 2017

(65) Prior Publication Data

US 2018/0372166 A1 Dec. 27, 2018

(51) Int. Cl.
| F16D 13/64 | (2006.01) |
| F16D 25/00 | (2006.01) |
| F16D 28/00 | (2006.01) |
| F16D 13/74 | (2006.01) |
| F16D 13/52 | (2006.01) |
| F16D 13/69 | (2006.01) |

(52) U.S. Cl.
CPC ........... *F16D 13/648* (2013.01); *F16D 13/69* (2013.01); *F16D 13/74* (2013.01); *F16D 25/00* (2013.01); *F16D 28/00* (2013.01); *F16D 13/52* (2013.01)

(58) Field of Classification Search
CPC ....................................................... F16D 13/69
See application file for complete search history.

(56) References Cited

U.S. PATENT DOCUMENTS

| 2,927,673 | A | * | 3/1960 | Sand | ...................... F16D 13/648 |
| | | | | | 192/107 C |
| 4,958,712 | A | * | 9/1990 | Suganuma | .............. F16D 13/52 |
| | | | | | 192/113.36 |
| 8,932,169 | B2 | * | 1/2015 | Paciotti | ................... F16D 13/52 |
| | | | | | 475/159 |
| 9,400,018 | B2 | | 7/2016 | Kremer et al. | |

* cited by examiner

*Primary Examiner* — Mark A Manley

(57) ABSTRACT

A friction clutch assembly for an automatic transmission is provided. The friction clutch assembly is configured to move between an applied position and a released or disengaged position. A plurality of clutch plates may include friction plates and interleaved reaction plates, plus an apply plate and a backing plate. A separator feature is disposed adjacent to at least one of the reaction plates, the friction plates, the apply plate, and the backing plate. At least one of the reaction plates, the friction plates, the apply plate, and the backing plate defines a passage configured to allow fluid to flow through the friction clutch assembly and around the separator feature.

15 Claims, 9 Drawing Sheets

FLUID DRAINING THROUGH CLUTCH PLATES HAVING SEPARATOR FEATURES

FIELD

The present disclosure relates to friction clutch assemblies used in automatic motor vehicle transmissions.

INTRODUCTION

A typical multiple speed transmission uses a combination of friction clutch assemblies, planetary gear arrangements, and fixed interconnections to achieve a plurality of gear ratios. The number and physical arrangement of the planetary gear sets, generally, are dictated by packaging, cost and desired speed ratios. Friction clutch pack assemblies for engaging and disengaging various gears within a transmission typically include interleaved clutch plates that are compressed against a backing plate.

Previously, it was desirable to build friction clutch assemblies with as few parts as necessary to sufficiently transfer torque within the transmission, to avoid adding cost and weight to the transmission. In recent years, however, carbon dioxide emissions requirements have become increasingly stringent, and therefore, the transmission losses, such as spin losses, have become more of a concern than in the past.

SUMMARY

The present disclosure provides a friction clutch assembly that includes a plurality of separator features, such as separator spring plates, to bias clutch plates away from each other when not engaged, in an effort to reduce spin losses. However, it was discovered that the spring plates alone did not sufficiently reduce spin losses because transmission fluid was trapped within the friction clutch assembly by the separator features, resulting in spin loss between clutch plates due to drag created by the trapped transmission fluid. Accordingly, the present disclosure provides a friction clutch assembly having separator features between clutch plates and wherein the clutch plates define a plurality of passages through them to allow transmission fluid to move through the clutch assembly around the separator features.

In one form, which may be combined with or separate from the other forms disclosed herein, a friction clutch assembly for an automotive transmission is provided. The friction clutch assembly is configured to move between an applied position and a released position and has a plurality of clutch plates. The plurality of clutch plates includes friction plates splined to a first transmission member and reaction plates interleaved with the friction clutch plates, where the reaction clutch plates are splined to a second transmission member. An apply plate is disposed adjacent to a first end the plurality of clutch plates. A backing plate is disposed adjacent to a second end of the plurality of clutch plates. A separator feature is disposed adjacent to one or more of the reaction plates, the friction plates, the apply plate, and the backing plate. At least one of the reaction plates, the friction plates, the apply plate, and the backing plate defines a passage configured to allow fluid to flow through the friction clutch assembly and around the separator feature.

In another form, which may be combined with or separate from the other forms disclosed herein, a clutch plate configuration for use in an automotive transmission is provided. The clutch plate configuration include a plurality of reaction plates. Each reaction plate has a plurality of teeth disposed along an outer diameter, a radial section extending radially inwardly from the outer diameter, and an inner section extending radially inwardly from the radial section. Each reaction plate defines a plurality of passages within the reaction plate, each passage being defined in the radial section of the reaction plate. A plurality of separator features is interleaved with the plurality of reaction plates. Each separator feature overlaps with at least one passage of the plurality of passages so that fluid may flow past the plurality of separator features through the plurality of passages. Each separator feature is configured to bias the reaction plates away from each other.

In yet another form, which may be combined with or separate from the other forms disclosed herein, a clutch assembly for an automotive transmission is provided. The clutch assembly includes a housing having a plurality of internal splines extending radially inwardly from an interior surface of the housing and a hub having a plurality of external splines extending radially outwardly from an outer surface of the hub. A plurality of friction plates is included, each having a friction plate inner diameter, a friction plate outer diameter, a first face and a second face. Each friction plate has a plurality of internal teeth extending from the friction plate inner diameter, and at least one of the first and second faces has friction material disposed thereon. The plurality of internal teeth intermesh with the plurality of external splines on the outer surface of the hub. A plurality of reaction plates is provided, each having a reaction plate inner diameter and a reaction plate outer diameter. Each reaction plate has a plurality of external teeth extending from the reaction plate outer diameter. The plurality of external teeth intermesh with the plurality of internal splines on the inner surface of the housing. The plurality of reaction plates are interleaved with the plurality of friction plates. Each reaction plate has a radial section extending radially inwardly from the reaction plate outer diameter and an inner section extending radially inwardly from the radial section. Each reaction plate defines a plurality of passages within the radial section of the reaction plate. A plurality of separator spring plates is interleaved with the plurality of reaction plates. The passages are located to allow fluid to flow past the separator spring plates through the passages. Each separator spring plate is configured to bias the reaction plates away from each other or from the apply plate or the backing plate, and each separator spring plate is disposed radially outwardly of each friction plate outer diameter.

Additional features may optionally be provided in connection with any of the forms described above, such as: the separator feature being a spring plate; the spring plate having a wavy configuration and being piloted by the second transmission member; the first transmission member being an inner hub; the second transmission member being a housing surrounding the plurality of clutch plates; the spring plate being disposed radially outwardly of the plurality of friction plates; each passage being an outer groove; each passage being an aperture; each of the reaction plates defining a plurality of passages therein; the plurality of passages being located circumferentially about a central axis; the plurality of passages being located radially outwardly of each friction plate; the apply plate defining a plurality of passages therein; the backing plate defining a plurality of passages therein; each friction plate having friction material disposed on a face of the friction plate; the friction material defining friction material grooves formed therethrough; further comprising an actuator disposed on one side of the plurality of clutch plates; the actuator being configured to compress the plurality of clutch plates into the applied position; the actuator being electric, hydraulic, or pneumatic; the apply plate and the backing plate each having a radial section extending radially inwardly from an outer diameter and an inner section extending radially inwardly from the radial section; each passage within the apply plate and the backing plate being defined in the radial sections; a plurality of friction plates being interleaved with the plurality of reaction plates; each friction plate being disposed radially inwardly of the radial section of each reaction plate and radially inwardly of the separator features; each friction plate having a plurality of teeth extending from an inner diameter of the friction plate; each separator feature being a wavy annular plate; each outer groove or aperture extending inwardly from one of the reaction plate outer diameters; each separator spring plate overlapping with the plurality of passages; each passage extending radially inwardly from the separator spring; and the plurality of friction plates being spaced apart from the plurality of separator features.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 7A:
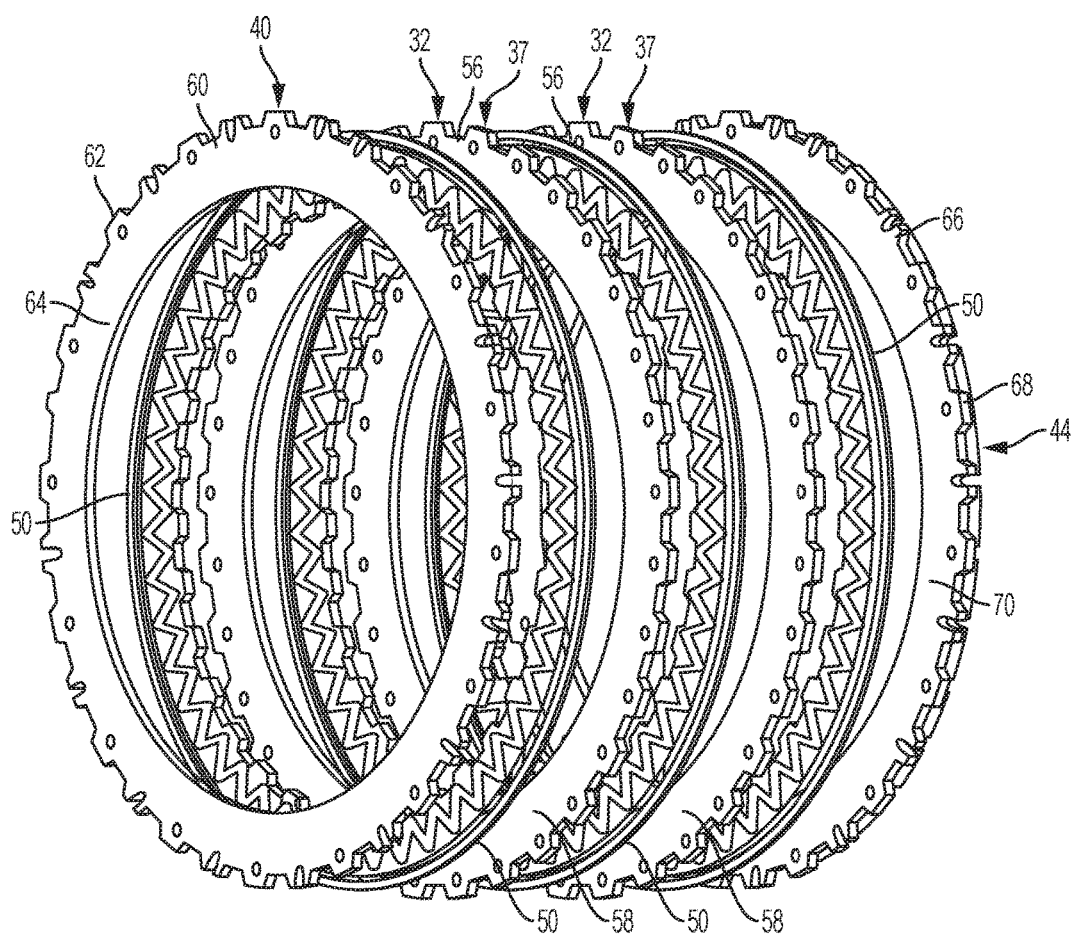
FIG. 7A is an exploded view of a portion of the friction clutch assembly shown in FIGS. 1-6, including a backing plate, an apply plate, a plurality of friction clutch plates, a plurality of reaction plates, and a plurality of separator features, in accordance with the principles of the present disclosure.
Figure 7B:
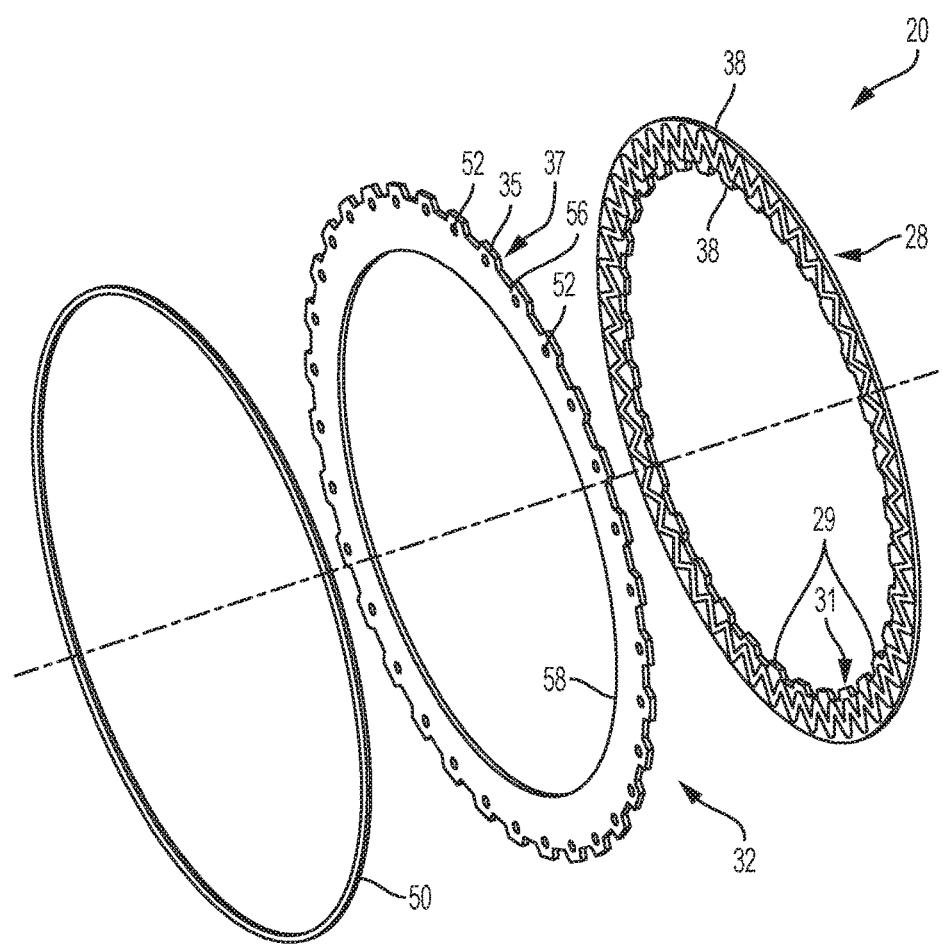
FIG. 7B is an exploded view of a portion of the friction clutch assembly shown in FIGS. 1-7A, showing merely one separator feature, one reaction plate, and one friction clutch plate, according to the principles of the present disclosure.
Figure 8A:
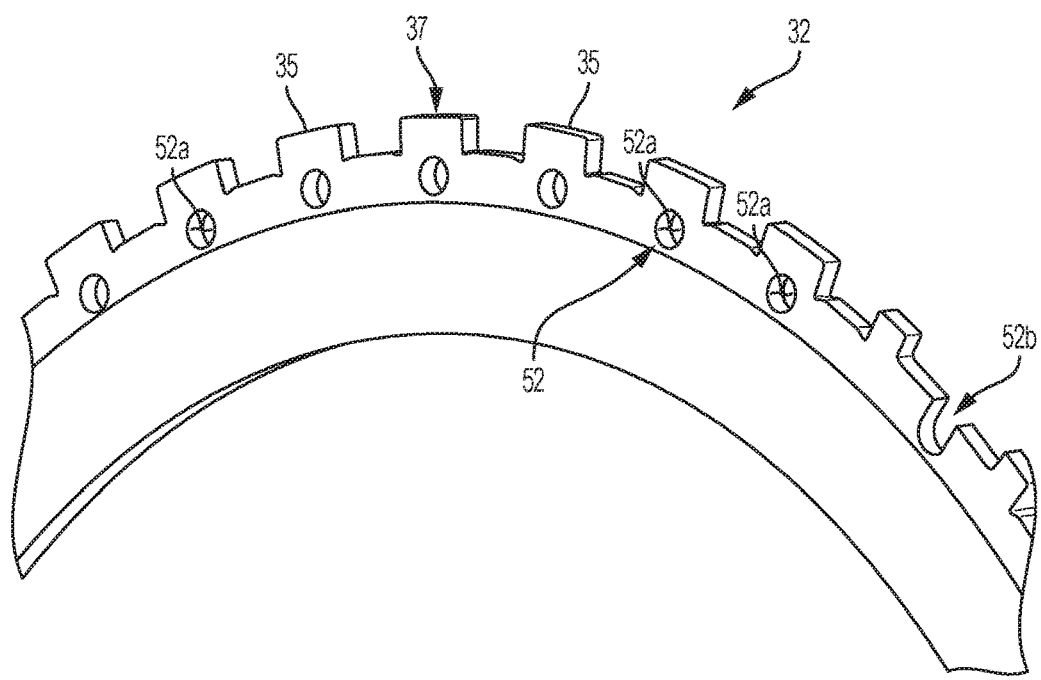
FIG. 8A is a perspective view of a portion of a reaction plate of the friction clutch assembly shown in FIGS. 1-7B, in accordance with the principles of the present disclosure.
Figure 8B:
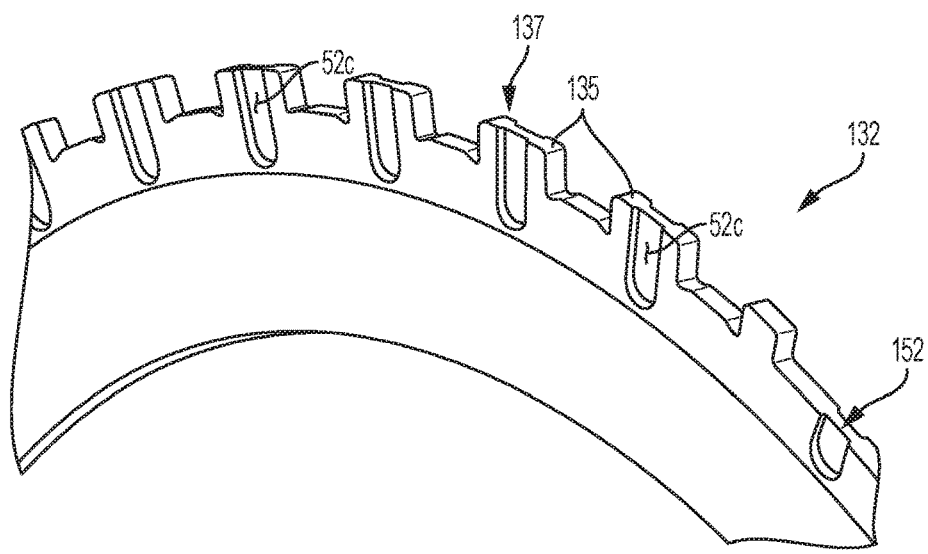
FIG. 8B is a perspective view of a portion of another variation of a reaction plate for use with the friction clutch assembly shown in FIGS. 1-7B, according to the principles of the present disclosure.
Figure 9:
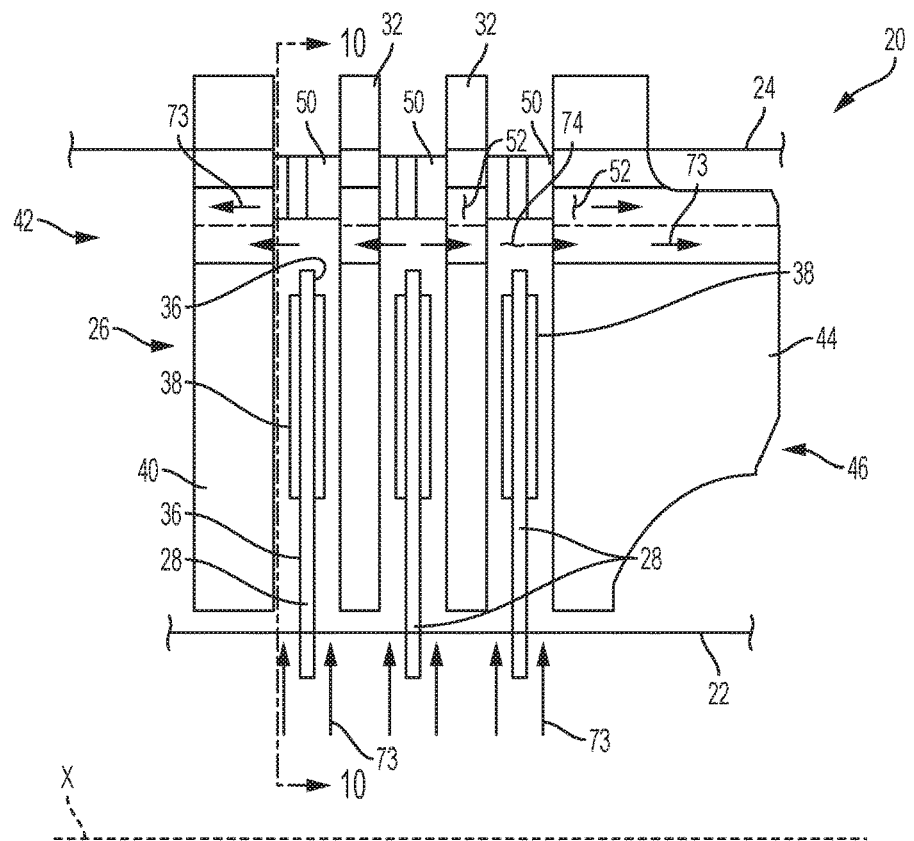
Figure 10:
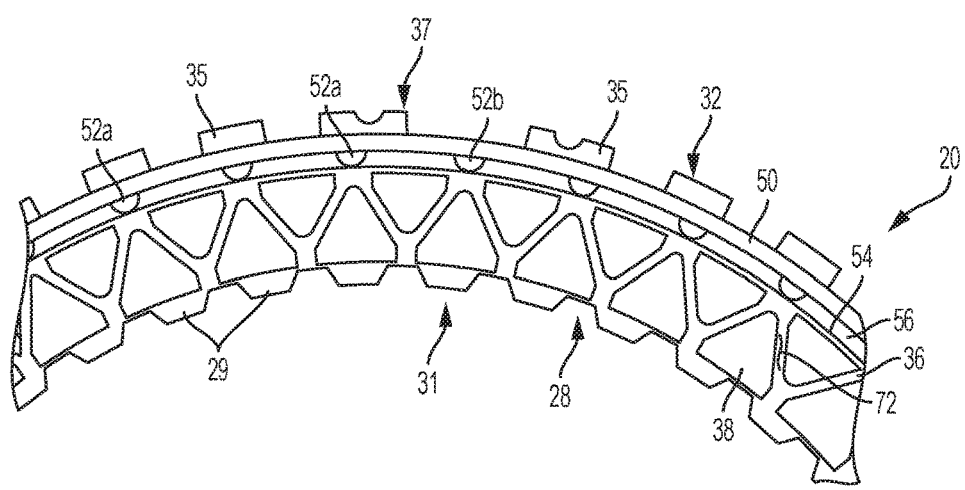

FIG. 9 is a cross-sectional view of the friction clutch assembly shown in FIGS. 1-7B, schematically showing fluid flowing therethrough, in accordance with the principles of the present disclosure; and FIG. 10 is an assembled cut-away view of the one separator plate, the one reaction plate, and the one friction clutch plate shown in FIG. 8B, and taken along the line 10-10 in FIG. 9, according to the principles of the present disclosure.

DETAILED DESCRIPTION

The following description is merely exemplary in nature and is not intended to limit the present disclosure or its application or uses.

With reference to FIGS. 1-4, an illustration of a portion of a friction clutch assembly is illustrated and generally designated at 20. The clutch assembly 20 may be part of an automotive transmission 21, such as an automatic transmission, that may include a plurality of planetary gear assemblies, which are generally not shown, but one or more gears or members of which may be coupled to a clutch hub 22 and/or a clutch housing 24. The clutch housing 24 may be the entire transmission housing/case 23, or a smaller clutch housing within the transmission case 23. The friction clutch assembly 20 is operably disposed between the hub 22 and the housing 24. The friction clutch assembly 20 is configured to selectively couple the hub 22 (and any planetary gear elements, shafts, or stationary elements coupled to the hub 22) to the housing 24 (and any planetary gear elements, shafts, or stationary elements coupled to the housing 24) through a plurality of interleaved clutch plates 26.

The plurality of interleaved clutch plates 26 includes a first plurality of smaller diameter clutch plates or discs, referred to as friction plates 28, which are slidably coupled to the hub 22 by interengaging male and female splines 30 of the hub 22 with the friction clutch plates 28. Thus, the hub 22 has a plurality of external splines 30 extending radially outwardly from an outer surface of the hub 22. A plurality of teeth 29 extend along an inner diameter 31 of each friction clutch plate 28, and the teeth 29 engage or intermesh with the splines 30 to prevent rotational motion of the friction clutch plates 28 with respect to the hub 22. In accordance with conventional friction clutch practice, at least one face 36 of each of the friction clutch plates or discs 28 includes friction material 38 disposed thereon.

A second plurality of larger diameter clutch plates or discs, which are referred to as reaction plates 32, are coupled to the housing 24 by interengaging male and female splines 34 of the housing 24 with the reaction plates 32. Thus, the housing 24 has a plurality of internal splines 34 extending radially inwardly from an interior surface of the housing 24. A plurality of teeth 35 extend along an outer diameter 37 of each reaction plate 32, and the teeth 35 engage or intermesh with the splines 34 to prevent rotational motion of the reaction plates 32 with respect to the housing 24. In this example, the reaction plates 32 are wider and thicker than the friction plates 28, having a greater outer diameter 37 than the outer diameter 54 of the friction clutch plates 28. The plurality of reaction clutch plates 32 are interleaved with the plurality of friction clutch plates 28.

An apply plate 40 is disposed at a first end 42 of the friction clutch assembly 20 adjacent to a friction clutch plate 28 in this example, and a backing plate 44 is disposed at a second opposite end 46 of the friction clutch assembly 20 adjacent to an end friction clutch plate 28a in this example. At the first end 42 of the friction clutch assembly 20 (the left end in the orientation of FIG. 1) is disposed a hydraulic, electric, or pneumatic operator or actuator 48, which selectively provides an axial compressive force to the friction clutch assembly 20 to cause torque transfer therethrough and to move the friction clutch assembly 20 into an engaged or applied position. In the engaged or applied position, the plurality of clutch plates 26 are compressed against the backing plate 44 (which is typically held axially by a snap ring (not shown)) to couple the hub 22 to the housing 24. A spring (not shown) may be configured to return the friction clutch assembly 20 to a disengaged, separated, or released position when the actuator 48 is released.

Figure 1:
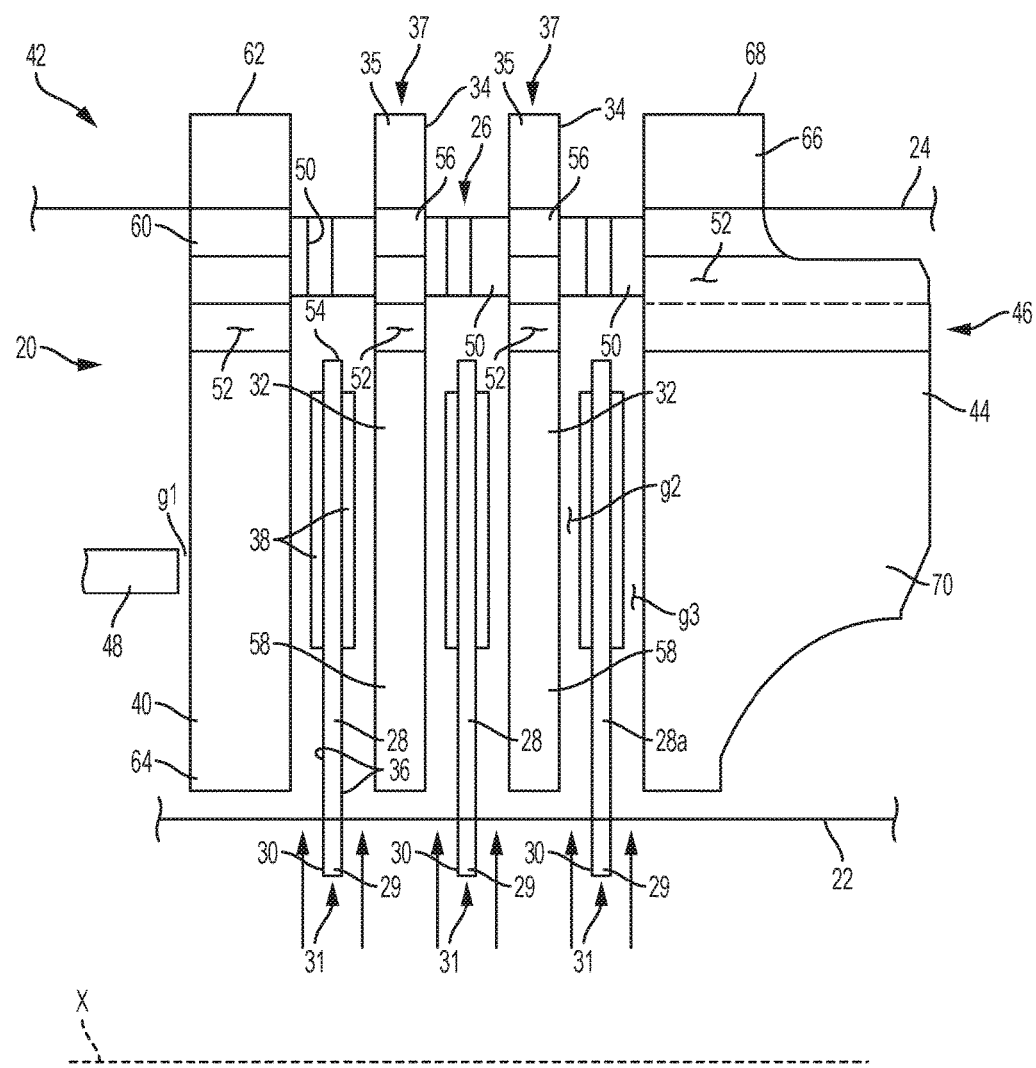
FIG. 1 is a cross-sectional view of a friction clutch assembly, in accordance with the principles of the present disclosure.
Figure 2:
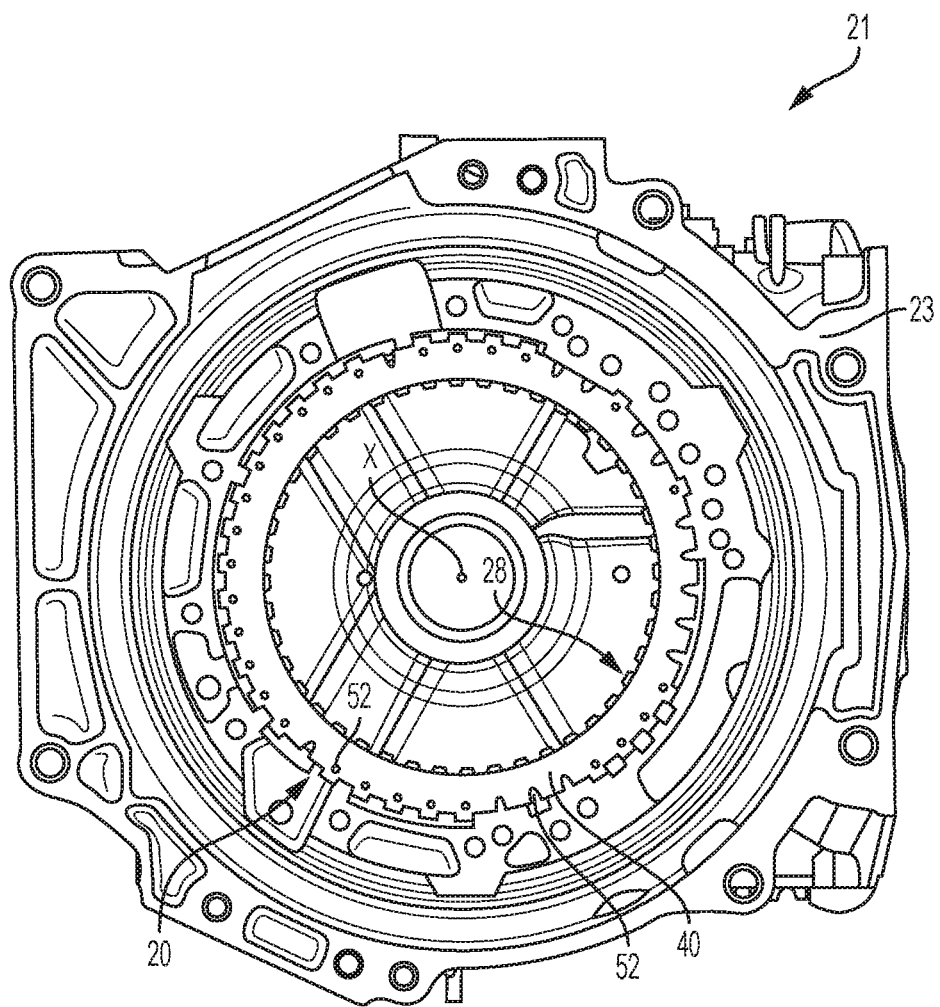
FIG. 2 is a cut-away end view of a transmission including the friction clutch assembly shown in FIG. 1, according to the principles of the present disclosure.
Figure 3:
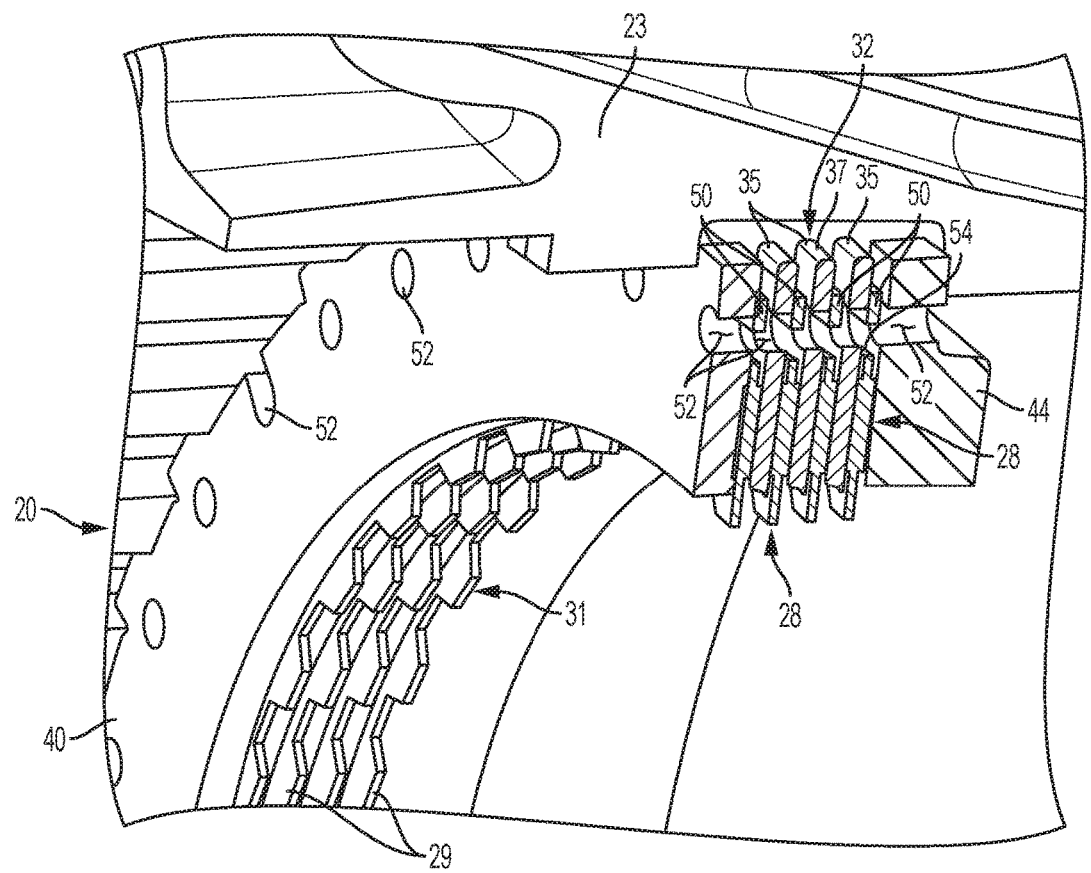
FIG. 3 is a cross-sectional perspective view of a portion of the transmission shown in FIG. 2, including the friction clutch assembly shown in FIGS. 1-2, in accordance with the principles of the present disclosure.
Figure 4:
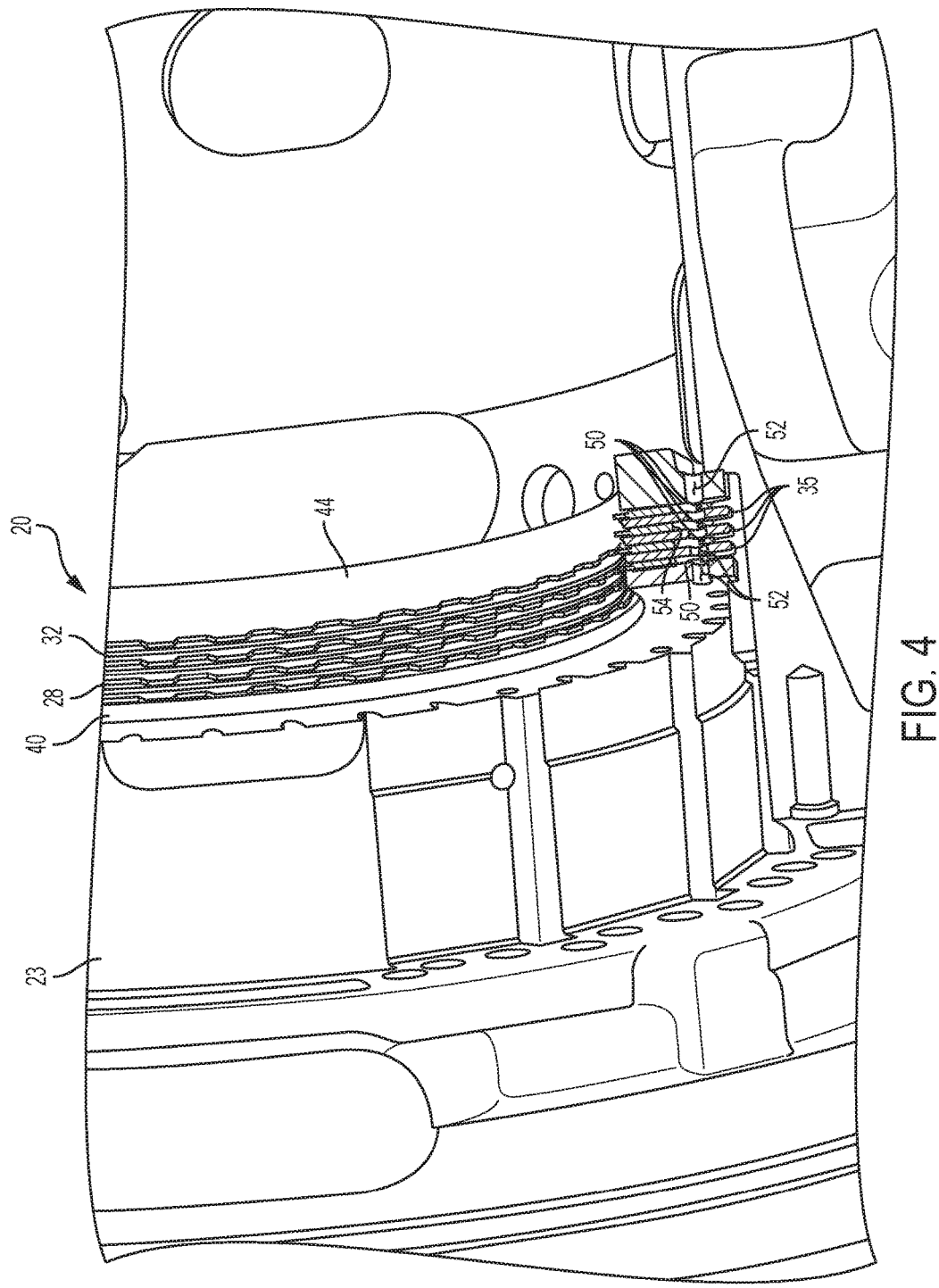
FIG. 4 is a cross-sectional perspective view of another portion of the transmission shown in FIGS. 2-3, including the friction clutch assembly shown in FIGS. 1-3, according to the principles of the present disclosure.
Figure 5:
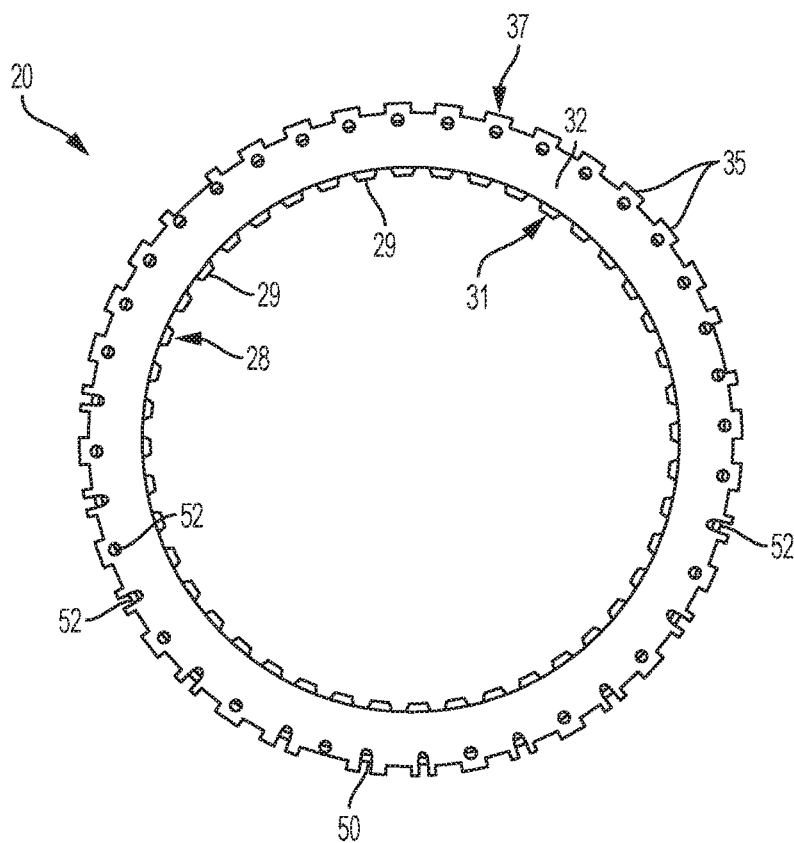
FIG. 5 is an end view of a portion of the friction clutch assembly shown in FIGS. 1-4, in accordance with the principles of the present disclosure.
Figure 6:
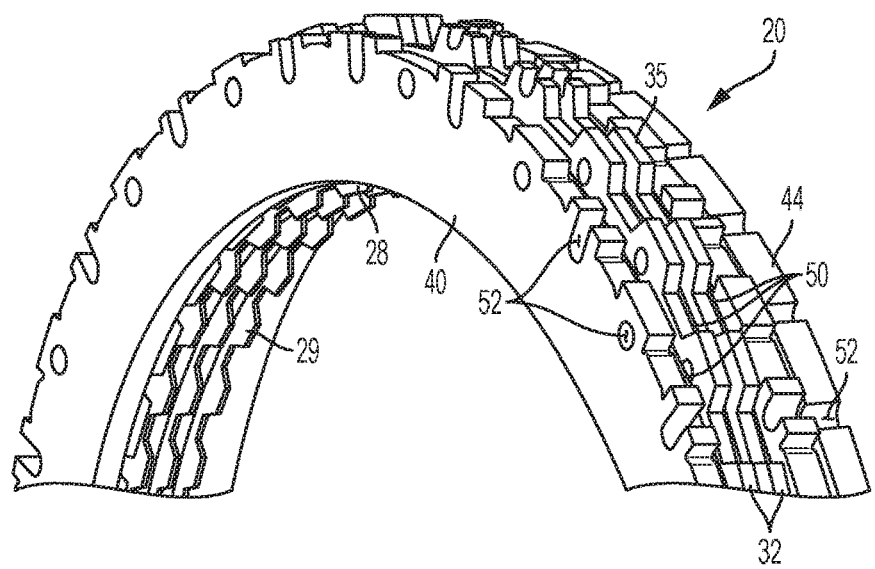
FIG. 6 is a perspective view of a portion of the friction clutch assembly shown in FIGS. 1-5, according to the principles of the present disclosure.

Though two reaction plates 32 and three friction plates 28 are illustrated in FIG. 1, it should be understood that any other suitable number of reaction plates 32 and friction plates 28 could be used, without falling beyond the spirit and scope of the present disclosure. For example, additional clutch plates 28, 32 are shown in some of the other figures. In addition, the placement and size of the reaction plates 32 and the friction plates 28 could be reversed such that the friction plates 28 are larger than the reaction plates 32 and coupled to the housing 24, if desired. Furthermore, the reaction plates 32 could also have friction material 38 disposed thereon, in addition to the friction plates 28 having friction material 38 disposed on their faces 36.

In FIG. 1, the friction clutch assembly 20 is illustrated in the disengaged, separated, or released position. In the disengaged, separated, or released position, the actuator 48 is disengaged and separated from the apply plate 40, and a small gap g1 may exist between the actuator 48 and the apply plate 40. FIG. 1 also shows minute gaps g2 between each of the clutch plates 28, 32; however, it should be understood that the minute gaps g2 may not be gaps at all, but rather, mere slippage between the friction plates 28 and the reaction plates 32. There may also be a gap g3 or slippage between backing plate 44 and the end friction clutch plate 28a, when the clutch assembly 16 is in the disengaged position.

The clutch assembly 20 is configured to be moved between the disengaged or released position and the engaged or applied position. In the engaged or applied position (not shown), the actuator 48 contacts and compresses the apply plate 40 to compress the pluralities of friction and reaction plates 28, 32 against the backing plate 44. In the engaged or applied position, the transmission members 22, 24 to which the clutch plates 28, 32 are splined are coupled together by compressing the pluralities of clutch plates 28, 32 against the backing plate 44. In the engaged or applied position, there are no gaps g1, g2, g3 and there is negligible or no slippage between the actuator 48 and the clutch plates 28, 32.

Referring now to FIGS. 5-7B, in addition to FIGS. 1-4, a separator feature is disposed adjacent to at least one of the reaction plates 32, the friction plates 28, the apply plate 40, and the backing plate 44. In this example, the separator features are annular or ring-shaped steel spring plates 50 that have a wavy configuration, as best seen in FIG. 7B. In the alternative, however, the separator features could be another type of spring or even rubber separators, without falling beyond the spirit and scope of the present disclosure. The spring plates 50 are piloted by the outer housing 24 to maintain the radial position of the spring plates 50 about the central axis X.

In the illustrated example, a spring plate 50 is disposed between each of the reaction plates 32; a spring plate 50 is disposed between the reaction plate 32 and the apply plate 40; and a spring plate 50 is disposed between a reaction plate 32 and the backing plate 44. Thus, the spring plates 50 are interleaved with the plurality of reaction plates 32. Each separator feature or spring plate 50 is configured to bias the reaction plates 32 away from each other and away from the apply plate 40 and the backing plate 44. Further, each separator feature or spring plate 50 may be configured to assist with returning the reaction plates 32 to a disengaged position when the actuator 48 is disengaged.

Each of reaction plates 32, the apply plate 40, and the backing plate 44 define a plurality of passages 52 configured to allow fluid to flow through the friction clutch assembly 20 and around the spring plates 50. In other variations, friction plates 28 could also have the passage 52, for example, if the friction plates 28 were the larger clutch plates splined along the outer diameter. In the illustrated example, each of the reaction plates 32, the apply plate 40, and the backing plate 44 define a plurality of passages 52 located circumferentially about the central axis X and located radially outward of each friction plate 28.

Each spring plate 50 is disposed radially outwardly of the plurality of friction plates 28; thus, each spring plate 50 is disposed radially outwardly of the outer diameter 54 of the friction plates 28, where the friction plates 28 are spaced apart from the spring plates 50. In this example, the passages 52 overlap with the spring plates 50 and extend radially inwardly from the spring plates 50. In other words, the spring plates 50 are located in the radial space between the outer diameter 54 of the friction plates 28 and the housing 24.

Referring to FIGS. 7A-7B, each of the reaction plates 32 has a radial section 56 extending radially inwardly from the outer diameter 37 and an inner section 58 extending radially inwardly from the radial section 56. Each passage 50 formed within the reaction plate 32 is defined in the radial section 56 of a reaction plate 32 and not in the inner section 58; in other configurations, however, the passages 52 could also extend into the inner section 58. The inner section 58 overlaps with the friction plates 28. In the illustrated example, the passages 52 defined in the reaction plates 32 are entirely radially outward of the friction plates 28.

Similarly, the apply plate 40 has a radial section 60 extending radially inwardly from an outer diameter 62 and an inner section 64 extending radially inwardly from the radial section 60. Each passage 52 within the apply plate 40 is defined in the radial section 60 of the apply plate 40 and not in the inner section 64, in the illustrated example. Likewise, the backing plate 44 has a radial section 66 extending radially inwardly from an outer diameter 68 and an inner section 70 extending radially inwardly from the radial section 66. Each passage 52 within the backing plate 44 is defined in the radial section 66 of the backing plate 44 and not in the inner section 70, in the illustrated example. Accordingly, the passages 50 defined in the apply plate 40 and in the backing plate 44 are entirely radially outward of the friction plates 28.

Referring now to FIG. 8A, examples of passages 52 are illustrated in a reaction plate 32. The passages 52 may be in the form of apertures, such as holes 52a, or such as slots 52b that extend to the outer diameter 37. The slot or slots 52b extend radially inwardly from the outer diameter 37. When assembled, the spring plate 50 overlaps with the holes 52a and the slot(s) 52b, with the holes 52a and the slot(s) 52b extending radially inwardly from the spring plate 50, as best seen in FIG. 9.

Referring now to FIG. 8B, another example of passages 152 are illustrated in another reaction plate 132. The reaction plate 132 could alternatively be used in place of the reaction plate 32 in the friction clutch assembly 20 described any of the above description or drawings. The passages 152 may be in the form of grooves 52c that extend to the outer diameter 137. The grooves 52c extend radially inwardly from the outer diameter 137 along the reaction plate 132 in the form of a cavity. When assembled, the spring plate 50 overlaps with the grooves 52c, with the grooves 52c extending radially inwardly from the spring plate 50, similar to as shown in FIG. 9 (except with grooves instead of holes or slots).

It should be understood that although a reaction plate 32, 132 is illustrated in FIGS. 8A-8B, the same configuration of passages 50, 152, 52a, 52b, 52c could be defined in the apply plate 40 and the backing plate 44.

Referring to FIG. 9, fluid 73 flows into the clutch assembly 20 from a center of the transmission 21. The fluid 73 flows past the friction plates 28 and radially outward of the friction plates 28 into radial space 74 defined between the friction plates 28 and housing 24. The passages 52 allow fluid 73 to lubricate the components without becoming trapped in the clutch assembly 20, thereby reducing drag between the friction plates 28 and the reaction plates 32 (and also the apply plate 40 and the backing plate 44) that would otherwise be caused by trapped fluid. In this example, each spring plate 50 overlaps with at least one passage 52, 152 so that fluid may flow past the spring plates 50 through the passage(s) 52, 152. Therefore, the plurality of passages 52, 152 are located to allow fluid to flow past the plurality of separator spring plates 50 through the plurality of passages 52, 152.

Referring now to FIG. 10, the friction material 38 disposed on the face 36 of the friction plate 28 forms grooves 72 therethrough to allow fluid to flow past the plurality of friction plates 28 to further aid in the flow of fluid through the clutch assembly 20.

The description provided herein is merely exemplary in nature, and variations that do not depart from the gist thereof are intended to be within the spirit and scope of the present disclosure. Such variations are not to be regarded as a departure from the spirit and scope of the present disclosure.

What is claimed is:

1. A clutch plate configuration for use in an automotive transmission, the clutch plate configuration comprising:
    a plurality of reaction plates, each reaction plate of the plurality of reaction plates having a plurality of teeth disposed along an outer diameter, a radial section extending radially inwardly from the outer diameter, and an inner section extending radially inwardly from the radial section, each reaction plate defining a plurality of passages within the radial section of the reaction plate;
    a plurality of separator features interleaved with the plurality of reaction plates, each separator feature overlapping with at least one passage of the plurality of passages so that fluid may flow past the plurality of separator features through the plurality of passages, each separator feature being configured to bias the reaction plates apart;
    an apply plate disposed adjacent to a first end of the plurality of reaction plates and a backing plate disposed adjacent to a second end of the plurality of reaction plates, the apply plate and the backing plate each having a radial section extending radially inwardly from an outer diameter and an inner section extending radially inwardly from the radial section, each of the apply plate and the backing plate defining a plurality of passages therein, each passage being defined in the radial sections; and
    a plurality of friction plates interleaved with the plurality of reaction plates, each friction plate being disposed radially inwardly of the radial section of each reaction plate and radially inwardly of the plurality of separator features, the plurality of friction plates being spaced apart from the plurality of separator features, each friction plate having a plurality of teeth extending from an inner diameter of the friction plate.

2. The clutch plate configuration of claim 1, the clutch plate configuration being configured to move between an applied position and a released position, the clutch plate configuration further comprising:
    a first transmission member and a second transmission member, the plurality of friction plates being splined to the first transmission member and the plurality of reaction plates being splined to the second transmission member;
    an apply plate disposed adjacent to a first end of the plurality of reaction plates; and
    a backing plate disposed adjacent to a second end of the plurality of reaction plates.

3. The clutch plate configuration of claim 2, wherein each separator feature is an annular spring plate.

4. The clutch plate configuration of claim 3, each spring plate being piloted by the second transmission member.

5. The clutch plate configuration of claim 4, the first transmission member being an inner hub and the second transmission member being a housing surrounding the plurality of friction plates, each spring plate being disposed radially outward of the plurality of friction plates.

6. The clutch plate configuration of claim 5, wherein the passage is one of an outer groove and an aperture.

7. The clutch plate configuration of claim 6, wherein each of the reaction plates defines a plurality of passages therein, the plurality of passages being located circumferentially about a central axis and located radially outward of each friction plate.

8. The clutch plate configuration of claim 7, wherein each of the apply plate and the backing plate define a plurality of passages therein.

9. The clutch plate configuration of claim 8, each friction plate having friction material disposed on a face of the friction plate, the friction material defining friction material grooves formed therethrough.

10. The clutch plate configuration of claim 9, further comprising an actuator disposed on one side of the plurality of clutch plates, the actuator being configured to compress the plurality of clutch plates into the applied position, the actuator being one of electric, hydraulic, and pneumatic; and each passage extending radially inwardly from the spring plate.

11. The clutch plate configuration of claim 1, each separator feature being a wavy annular plate.

12. The clutch plate configuration of claim 11, each passage being defined as one of an outer groove and an aperture.

13. The clutch plate configuration of claim 12, each friction plate having friction material disposed on a face of the friction plate, the friction material having grooves formed therethrough to allow fluid to flow past the plurality of friction plates.

14. The clutch plate configuration of claim 13, further comprising an actuator disposed adjacent to the apply plate, the actuator being configured to be engaged and disengaged, the actuator being one of electric, hydraulic, and pneumatic, wherein when the actuator is engaged, the actuator is configured to compress the pluralities of reaction plates and friction plates into an applied position, each separator feature being configured to assist with returning the reaction plates to a separated position when the actuator is disengaged, and wherein each passage extends radially inwardly from the separator features.

15. A clutch plate configuration for use in an automotive transmission, the clutch plate configuration comprising:

a plurality of reaction plates, each reaction plate of the plurality of reaction plates having a plurality of teeth disposed along an outer diameter, a radial section extending radially inwardly from the outer diameter, and an inner section extending radially inwardly from the radial section, each reaction plate defining a plurality of passages within the radial section of the reaction plate;

a plurality of separator features interleaved with the plurality of reaction plates, each separator feature overlapping with at least one passage of the plurality of passages so that fluid may flow past the plurality of separator features through the plurality of passages, each separator feature being configured to bias the reaction plates apart; and a plurality of friction plates interleaved with the plurality of reaction plates, each friction plate being disposed radially inwardly of the radial section of each reaction plate and radially inwardly of the plurality of separator features, the plurality of friction plates being spaced apart from the plurality of separator features, each friction plate having a plurality of teeth extending from an inner diameter of the friction plate.

* * * * *